(12) United States Patent
Hahn

(10) Patent No.: US 6,226,570 B1
(45) Date of Patent: May 1, 2001

(54) MOTOR VEHICLE WITH AN AUTOMATIC VEHICLE DRIVING AND ELECTRONIC COMMUNICATION DEVICES

(75) Inventor: Stefan Hahn, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/161,727

(22) Filed: Sep. 29, 1998

(30) Foreign Application Priority Data

Sep. 29, 1997 (DE) .............................................. 197 43 024

(51) Int. Cl.$^7$ ................................. G06F 7/00; G06F 17/00
(52) U.S. Cl. ................................. 701/1; 701/200; 701/36; 701/23; 701/1
(58) Field of Search ................................. 701/1, 36, 35, 701/23, 200, 213

(56) References Cited

U.S. PATENT DOCUMENTS

| | | | |
|---|---|---|---|
| 5,469,356 | * 11/1995 | Hawkins et al. | 701/48 |
| 5,832,394 | * 11/1998 | Wortham | 701/1 |
| 5,844,987 | * 12/1998 | Matthews et al. | 380/9 |
| 5,974,347 | * 10/1999 | Nelson | 701/22 |
| 6,021,371 | * 2/2000 | Fultz | 701/200 |
| 6,037,901 | * 3/2000 | Devier et al. | 342/357.17 |
| 6,038,502 | * 3/2000 | Sudo | 1/200 |
| 6,076,040 | * 6/2000 | Akutsu | 701/207 |

FOREIGN PATENT DOCUMENTS

| | | |
|---|---|---|
| 195 32 203A1 | 3/1996 | (DE) . |
| 196 48 943A1 | 6/1997 | (DE) . |
| 197 02 383A1 | 8/1997 | (DE) . |

OTHER PUBLICATIONS

Microsoft and Intel pushing vehicle PCs—in: The Hansen report on automotive electronics vol. 10, No. 2, Mar. 1997 p. 1–2.

* cited by examiner

*Primary Examiner*—William A. Cuchlinski, Jr.
*Assistant Examiner*—Olga Hernandez
(74) *Attorney, Agent, or Firm*—Evenson, McKeown, Edwards & Lenahan, P.L.L.C.

(57) ABSTRACT

A motor vehicle has devices for temporary automatic vehicle driving and devices for the communication between a vehicle user and at least one electronic communication system. An operating device is provided by which the communication devices can be activated for implementing a communication operation and the vehicle driving devices can be activated for an automatic vehicle driving. When it is recognized that resumption of manual vehicle driving is becoming necessary, the activated vehicle driving devices transmit a take-over information signal to the communication devices, which display this take-over information on a display unit.

7 Claims, 3 Drawing Sheets

MOTOR VEHICLE WITH AN AUTOMATIC VEHICLE DRIVING AND ELECTRONIC COMMUNICATION DEVICES

BACKGROUND AND SUMMARY OF THE INVENTION

This application claims the priority of 197 43 024.4, filed Sep. 29, 1997, the disclosure of which is expressly incorporated by reference herein.

The invention relates to a motor vehicle having devices for temporary automatic driving of the vehicle, and devices for the communication between a vehicle user and at least one electronic communication system.

It is known to equip motor vehicles, such as automobiles, with devices for the automatic driving of the vehicle in order to temporarily free or relieve the vehicle driver of the task of driving the vehicle. Known automatic driving devices for automobiles include, for example, automatic cruise control units, automatic ranging control devices for an automatic vehicle driving in stop-and-go traffic and/or for the electronic coupling to a guide vehicle driving ahead on the turnpike, and devices for automatically staying within the driving lane.

On the other hand, it is known to equip motor vehicles with devices for the communication between a vehicle user (particularly, the driver) and one or several electronic communication systems; that is, to provide so-called telematic applications for the vehicle. Such telematic applications range from car radios (car telephone and television) to mobile office applications, such as a mobile telefax, mobile administration telework and mobile access to data networks, for example, to the Internet. The mobile data bank access permits an access from the vehicle to electronic information, for example, in the form of electronic newspapers, electronic mail or Internet information, and/or to electronic entertainment media, such as video games.

A known difficulty of such telematic applications in the vehicle is the fact that, when they are used by the vehicle operator, he or she must devote a certain amount of attention to selected electronic communication system; and the danger arises that his attention is diverted from the traffic situation. Although, in the case of conventional motor vehicles of the initially mentioned type, it is possible for the driver to activate devices for the automatic vehicle driving before activating a communication procedure with an electronic communication system, this does not completely eliminate the danger, because in some driving situations, the vehicle operator must subsequently resume driving the vehicle, and it is not ensured that automatic vehicle driving can be maintained during the whole communication procedure.

One object of the invention is to provide a motor vehicle of the initially mentioned type in which the functions of an automatic vehicle driving, on the one hand, and of communication with an electronic communication system, on the other hand, are performed with a high degree of safety in vehicle driving, and a high degree of operating comfort in use of the communication system.

This and other objects and advantages are achieved by the apparatus according to the invention, in which an operating device is provided which can activate both the communication devices for implementing a communication operation, and the vehicle driving devices for initiating automatic driving of the vehicle. This ensures that an automatic driving of the vehicle is activated when the vehicle driver requests the implementation of communication operation via an electronic communication system, and that access to electronic communication systems is allowed or permitted to the driver when the automatic vehicle function is activated.

The vehicle driving devices are designed such that, in their activated condition, they recognize in time that manual vehicle driving is becoming necessary, and in this case transmit a take-over information to the communication devices. They later display the respective received take-over information on a display unit. During a communication via electronic communication system, the vehicle driver is informed in time by way of this display device that he or she must soon again take over operation of the vehicle, so that he or she may terminate the current communication operation by then.

In one embodiment of the invention, the communication devices can determine, in their activated condition, when the system user (particularly, the driver) has made no input for a definable time period; that is, has no longer reacted to the communication system. In such a case, the communication devices emit a user input request signal for informing the vehicle driver. If this also does not lead to a reaction by the vehicle driver, the communication devices transmit a driver inactivity signal to the vehicle driving devices, informing them in time that the driver may momentarily be unable to take over the vehicle driving. The devices for the automatic vehicle driving can then, as required, in such a situation, provide a safe vehicle condition, for example, by the slowing or completely stopping the vehicle. This can prevent, for example, the danger of accidents when the vehicle driver is too tired.

In another embodiment of the invention, the operating device contains devices for receiving data input by the user for the communication devices. These user input devices may be arranged on a manually operated steering device of the vehicle, for example, on a steering wheel or steering handle. The user input devices comprise an input element in the form of a so-called track ball or mouse as is customary in the case of notebook computers for moving a screen indicator. Instead or in addition, the user input devices may contain a mouse key input element, that is, a group of two keys, as customary in the case of a computer mouse or as a functionally corresponding key arrangement in the case of notebook keyboards. As a result, without having to let go of the steering device, the vehicle driver can input information during a communication operation with an electronic communication system by a finger operation of the user input devices.

Other objects, advantages and novel features of the present invention will become apparent from the following detailed description of the invention when considered in conjunction with the accompanying drawings.

DETAILED DESCRIPTION OF THE DRAWINGS

Figure 1:
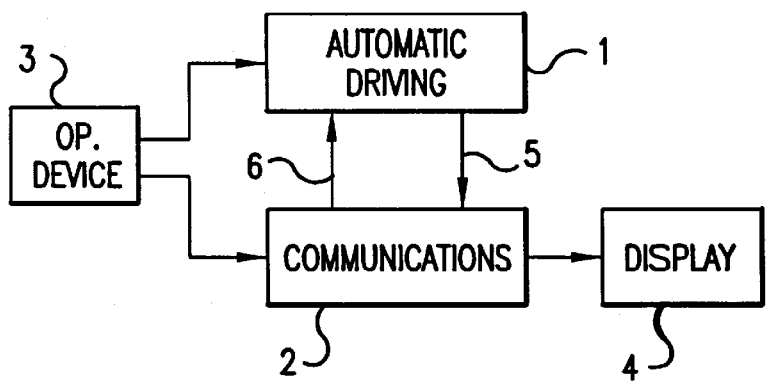
FIG. 1 is a block diagram of a system for a motor vehicle with devices for automatic vehicle driving and for communication via electronic communication systems.

The system according to the invention is shown in FIG. 1 as a block diagram and can be used in an automobile or another motor vehicle. It contains devices 1 for the temporary automatic driving of the vehicle, and devices 2 for a communication between a vehicle user (particularly, the driver) and at least one electronic communication system. The automatic vehicle driving devices 1 may be of conventional type, such as for example a cruise control device, a range control device, a lane tracking device, a device for electronic coupling of vehicles on the turnpike, and a device for automatic vehicle driving in stop-and-go traffic. As required, the communication devices 2 can comprise different vehicle telematic applications, such as a car radio, a car telephone and a television in the automobile as well as mobile office applications in the form of a mobile telefax and mobile teleworking devices for administrative activities. Further, the communication devices can contain connections to electronic data banks, such as an Internet access. This allows the vehicle driver to access electronic information in the Internet or in the form of electronic newspapers or electronic mail. In addition, the vehicle driver can access entertainment, for example, in the form of video games.

An operating device 3 is used as an input interface between the system user, on the one hand, and the vehicle driving devices 1 and communication devices 2, on the other hand. The communication devices contain a connected display device 4 which, in particular, may comprise a video screen. In addition, it may, as required, contain an acoustic indication by means of a loudspeaker.

By way of the operating device 3, the vehicle driver can activate the automatic vehicle driving devices 1, thereby causing subsequent automatic vehicle driving. In addition, by way of the operating device, he or she can activate the communication devices 2, thereby enabling use of the connected electronic communication system or systems. He or she will expediently activate the communication devices 2 when the automatic vehicle driving devices 1 are also activated, since these will then take over the vehicle driving task and relieve the driver from this task.

Driving situations occur in some driving cycles in which a resumption of vehicle driving by the vehicle driver is expedient. The automatic vehicle driving devices 1 are designed to recognize such driving situations in time and generate a corresponding take-over signal or information. Such recognition may be performed by means of conventional detection and logic devices which are well known to those skilled in the art. If, in this case, the driver is just communicating by way of the communication devices 1 with an electronic communication system, he or she may not easily recognize that manual vehicle driving is becoming necessary; and he or she also may not easily recognize a visual or acoustic warning emitted directly by the vehicle driving devices 1.

In order to achieve an improvement in this regard, in the illustrated system, a coupling is provided between the vehicle driving devices 1 and the communication devices 2, which permits a bidirectional data exchange between these two devices 1, 2. This connection of the two devices 1, 2 provides, in particular, that, when it is recognized that a manual vehicle driving will soon become necessary, the automatic vehicle driving devices 1 generate a take-over information in the form of a corresponding take-over signal 5, and transmit it to the communication devices 2, where it is displayed on the display device 4. As a result, it is safely brought to the attention of the vehicle driver who, during the on-going communication operation observes this display device 4 and particularly its video screen, virtually continuously. The automatic vehicle driving devices 1 are set up such that they determine with a sufficient preliminary warning time that the driver should resume manual driving. As a further advantageous measure, the communication devices 2 are designed so that, based on user input, they can supply information on his reaction time and attention; for example, by detecting the user's reaction time during video games or when leafing through the electronic newspaper.

If the communication devices activated by the vehicle driver recognize that, for a definable time period, he or she has not operated the activated electronic communication system, they request the vehicle driver by way of their connected display device 4 to carry out an input reaction. If thereafter, a corresponding input reaction still does not occur, the communication devices 2 will infer that the vehicle driver may momentarily not be available for a possible take-over of the vehicle driving task. In this case, the communication devices 2 use their coupling with the vehicle driving devices 1 to transmit a corresponding driver inactivity signal 6 to the vehicle driving devices 1. This signal 6 informs the automatic vehicle driving devices 1 of the possibility that the vehicle driver currently may not be available to take over vehicle driving. The vehicle driving devices 1 are preferably designed so that, in case of such a recognized driver inactivity, they automatically provide a safe vehicle condition. That is, they may sufficiently slow down the vehicle or, as required, stop it completely. They will carry out this measure no later than the point in time at which they recognize that, imminently a continued automatic vehicle driving will no longer be safely possible.

Figure 2:
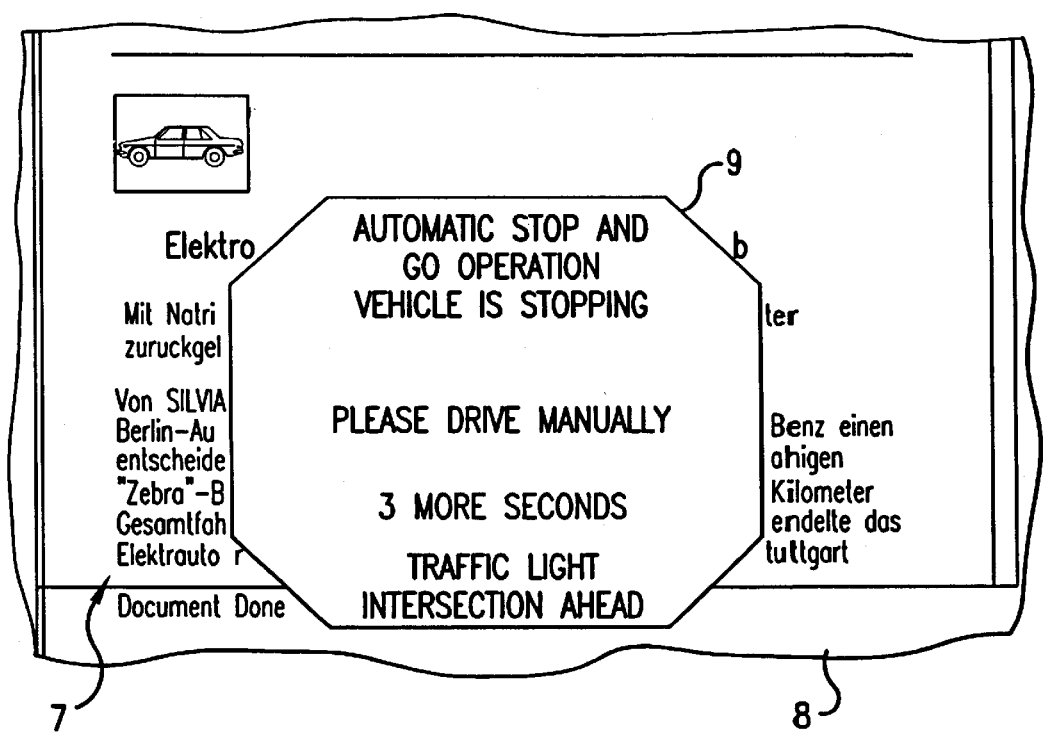
FIG. 2 is a view of an example of a display on a video screen of a display unit of the communication devices in a certain driving situation.
Figure 3:
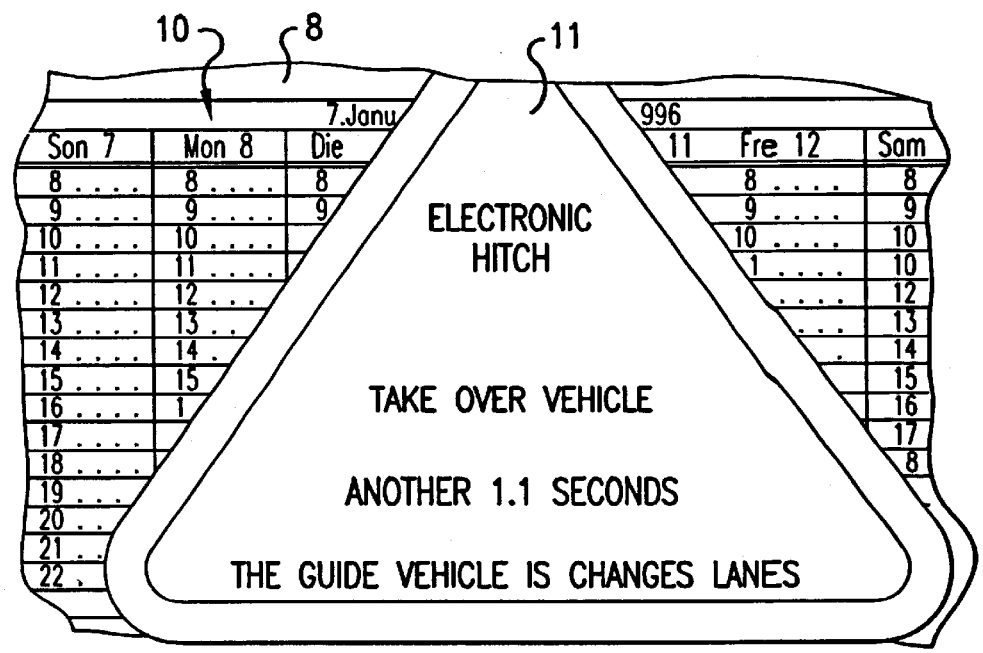
FIG. 3 is a view corresponding to FIG. 2 but in a different driving situation.
Figure 4:
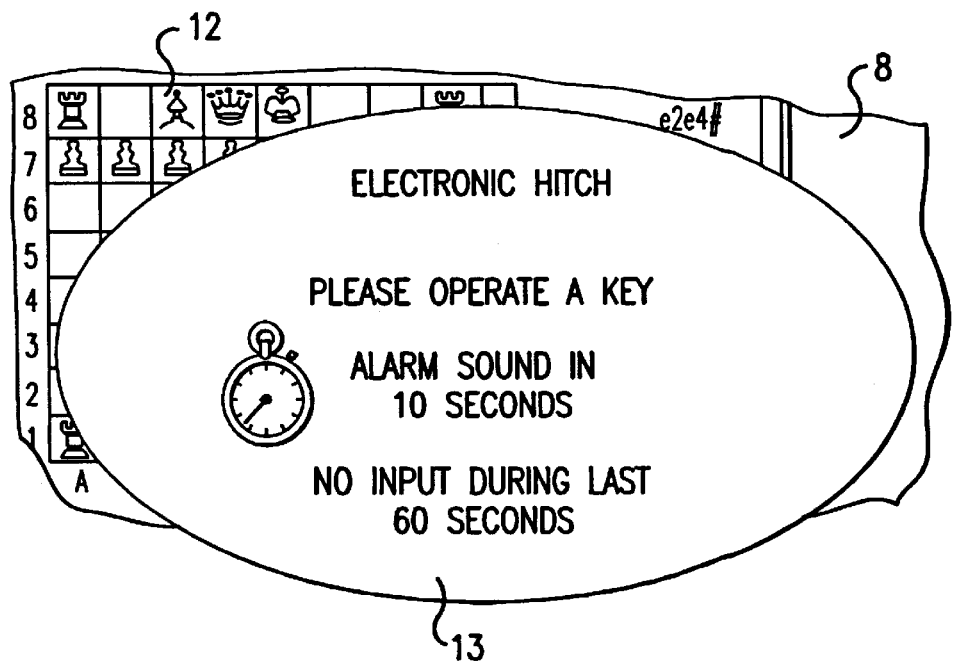
FIG. 4 is a view corresponding to FIG. 2, but for still another driving situation.

FIGS. 2 to 4 illustrate three selected situations in which, during a current communication operation, vehicle-driving information for the driver is faded in on a video screen 8 of the display device 4. In FIG. 2, the vehicle driver has activated the communication devices 2 to access an electronic newspaper on the Internet, of which he or she is reading a page 7 which is displayed as a cutout on the video screen 8. During this time, automatic vehicle driving operation is activated in the form of a range control device for an automatic stop-and-go traffic; that is, an automatic stop-and-go operating device which in this example forms the automatic vehicle driving devices. At the point in time of FIG. 2, the automatic stop-and-go operating device recognizes, for example, that a traffic light intersection is being approached, and that manual vehicle driving should therefore be resumed, after the vehicle was stopped by the automatic device. In order to indicate this to the driver, the vehicle driving devices 1 transmit to the communication devices 2 the corresponding information which is then faded in by the communication devices 2 on the video screen 8 of the display device 4, in the form of a message window 9. This message window 9 contains information informing the vehicle driver that he or she must soon (in the indicated example, in three seconds) take over the manual driving of the vehicle, and why.

In the example of FIG. 3, the vehicle driver has just activated the communication devices 2 for communication with an electronic schedule, whereby a corresponding schedule 10 appears on the video screen 8 of the display device 4. Simultaneously, the automatic vehicle driving devices 1 are active—in this example, an electronic coupling device (a so-called "electronic hitch") which automatically holds the vehicle at a certain distance behind a guide vehicle driving ahead on the turnpike. At the point in time of FIG. 3, this guide vehicle changes driving lane. The lane change is recognized by the electronic hitch, which concludes that the vehicle must now be driven manually. In order to so indicate to the vehicle driver, who is involved in the scheduling, the vehicle driving device 1 transmits this information to the communication devices 2 which, in turn, fades it, in the form of a message window 11, into the display of the video screen 8 of its display device 4. It is also indicated to the vehicle driver how much time he or she has for resuming manual driving of the vehicle.

FIG. 4 shows a situation in which the vehicle driver has activated the communication devices 2 to access a video game data base, and has retrieved a chess game. The video screen 8 of the display device 4 shows the playing board 12. The automatic vehicle driving devices 1 again contain an electronic hitch corresponding to FIG. 3. The electronic hitch takes over automatic vehicle driving while the vehicle driver is involved in the chess game. At the point in time of FIG. 4, it has been determined by the communication devices 2 that the user had not carried out any operating input for the chess game for longer than a defined time period. By fading in a corresponding request window 13 on the video screen 8 of the display device 4, the communication devices 2 request the vehicle driver to key in an input for checking his presence, since no input has taken place during the last 60 seconds. The request window 13 also contains the information that the electronic hitch is active. In addition, the triggering of an alarm sound which will take place in 10 seconds is announced if a system input continues to be absent. In the latter case, the communication devices 2 will not only trigger the acoustic alarm sound but will also transmit a corresponding driver inactivity information to the automatic driving device 1. When this information is received, the electronic hitch then provides that the vehicle maintains a safe driving condition, for the purpose of which it may slow down the vehicle and possibly stop it completely.

Figure 5:
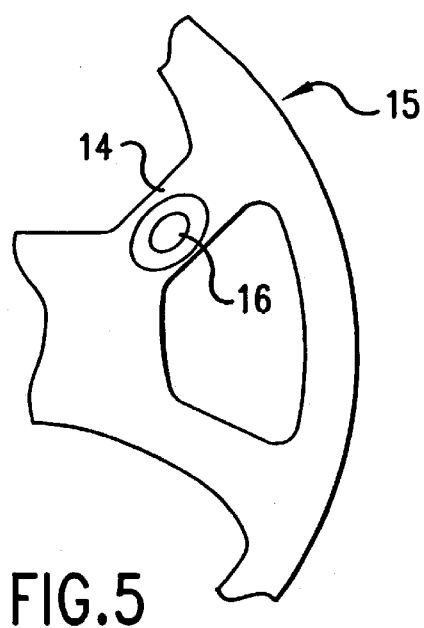
FIG. 5 is a partial schematic frontal view of a motor vehicle containing the system of FIGS. 1 to 4.
Figure 6:
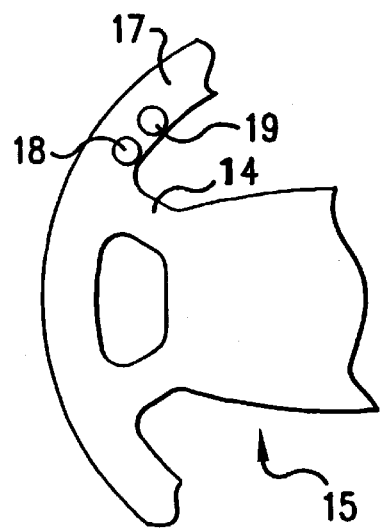
FIG. 6 is a partial schematic rear view of the steering wheel of FIG. 5.
Figure 7:
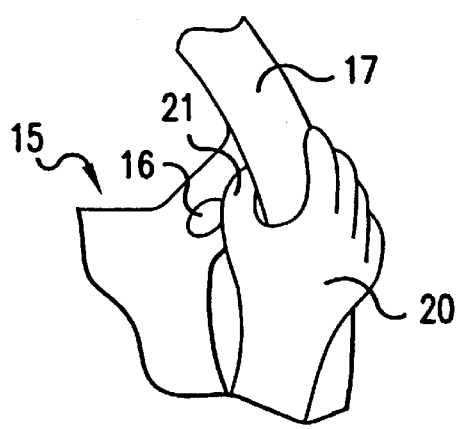
FIG. 7 is a partial schematic frontal view of the steering wheel corresponding to FIG. 5 but when used by the driver.

FIGS. 5 to 7 illustrate special advantageous operating elements which are preferably part of the operating device 3. These operating elements are used as inputs for the system user during the implementation of the communication operations by way of the activated communication devices 2 and are designed like elements with which the user is familiar from notebook mouse or computer mouse operations. Thus, on the one hand, as illustrated in FIG. 5, a so-called track ball 16 is arranged on a spoke 14 on the front side of a steering wheel 15 of the vehicle, as it is used in the case of notebooks in order to move the video screen indicator. In the present case, the track ball 16 may also be used for this purpose.

As illustrated in FIG. 6, two keys 18, 19 are arranged on the back side of the steering wheel 15, on the steering wheel rim 17 in the proximity to the spoke 14 which has the track ball 16 on the front side. The two keys 18, 19 carry out the function of a left and right mouse key of a computer mouse. Such mouse keys 18, 19 are known for controlling the dialogue between the communicating system user and the respective electronic communication system on the video screen 8 of the display device 4.

As the result of the special illustrated arrangement of the track ball 16 and of the two mouse keys 18, 19, the vehicle driver can operate these elements 16, 18, 19 with one hand 20 (for example, his or her right hand) while this hand 20 simultaneously reaches around the steering wheel rim 17, as illustrated in FIG. 7. Specifically, he or she operates the track ball 16 with his thumb 21 and the two mouse keys 18, 19 with the index finger and the middle finger. (The mouse keys 18, 19 may have a special design as mouse buttons.) Instead of the track ball 16, a similar input medium may be used which has the same function and is used in the case of notebook computers, such as a mouse stick in the manner of a joystick. The operating signals are transmitted from the track ball 16 and the two mouse buttons 18, 19, according to the system design, by way of connection lines which extend to the steering wheel 15, or in a wireless manner to a pertaining computer of the communication devices 2 on which the used communication application is implemented.

In addition to these illustrated input elements 14, 18, 19, the operating device 3 may comprise additional input elements, for example, an input element which permits a voice input by the vehicle driver.

It is shown that this computer mouse operation integrated into the steering wheel does not impair the steering of the vehicle during manual vehicle driving. As required, it may therefore be provided that the computer mouse operating elements 16, 18, 19 can also be utilized during time periods of manual vehicle driving, preferably, to a limited extent, for example, for adjusting stations in a car radio.

The above-description of an advantageous embodiment shows that, in the case of the motor vehicle according to the invention, the communication between the driver and the used communication application is designed such that the absorbing of information from the traffic situation is comparatively unimpeded, and the time required for taking over the manual driving control of the vehicle after an automatic vehicle driving is minimized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
    driving devices for the temporary automatic driving of the vehicle;
    communication devices for communication between an operator of the vehicle and at least one system extrinsic to operation of the vehicle;
    an interface for transmission of signals between said driving devices and said communication devices; and
    an operating device that is operable both to activate the communication devices for the implementation of a communication operation, and to activate the driving devices for automatic vehicle driving; wherein
    said driving devices include means for recognizing that a requirement for the vehicle operator to resume manual vehicle driving is imminent, at a time when a vehicle driving device is activated; and
    upon recognition that a requirement for the vehicle operator's resumption of manual vehicle operation is imminent, the activated driving device transmits a take-over signal to the communication devices, and the communication devices display a received take-over signal on a display device.

2. Motor vehicle according to claim 1, wherein, when a user input has not taken place for longer than a definable time period, the activated communication devices emit a user input request signal and, when still no user input takes place, transmit a driver inactivity information to the vehicle driving devices.

3. Motor vehicle according to claim 1, wherein the operating device comprises user input devices for the communication devices, which are arranged on a manually operated steering device of the vehicle and comprise at least one of a track ball element, mouse, joystick element and a mouse key input element.

4. Motor vehicle according to claim 2, wherein the operating device comprises user input devices for the communication devices, which are arranged on a manually operated steering device of the vehicle and comprise at least one of a track ball element, mouse, joystick element and a mouse key input element.

5. An operating device for a vehicle, comprising:

at least one automatic vehicle operation unit;

at least one electronic communications system;

a communication interface for communication between a vehicle user and said electronic communications system; and an operating device coupled to activate said at least one electronic communications system and said at least one automatic vehicle operation system;

wherein said at least one automatic vehicle operation unit includes means for recognizing a situation in which manual driving of the vehicle will become necessary, and for transmitting a signal indicative of said situation to said communication interface, for communication to the vehicle user.

6. An operating device for a vehicle according to claim 5 further comprising means for detecting when a user input has not taken place for longer than a definable time period, and for emitting a user input request signal via said communication interface.

7. Motor vehicle according to claim 6, wherein the operating device comprises user input devices for the communication devices, which are arranged on a manually operated steering device of the vehicle and comprise at least one of a track ball element, mouse, joystick element and a mouse key input element.

* * * * *